(12) United States Patent
Ann et al.

(10) Patent No.: US 9,151,634 B2
(45) Date of Patent: Oct. 6, 2015

(54) APPARATUS AND METHOD OF PROVIDING ROAD GUIDANCE BASED ON AUGMENTED REALITY HEAD-UP DISPLAY

(71) Applicant: Hyundai Motor Company, Seoul (KR)

(72) Inventors: Yun Sup Ann, Seoul (KR); Ju Hyun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/314,800

(22) Filed: Jun. 25, 2014

(65) Prior Publication Data

US 2015/0226568 A1  Aug. 13, 2015

(30) Foreign Application Priority Data

Feb. 11, 2014 (KR) .................. 10-2014-0015611

(51) Int. Cl.
*G01C 21/36* (2006.01)
(52) U.S. Cl.
CPC ...................................... *G01C 21/36* (2013.01)
(58) Field of Classification Search
CPC ....................................................... G01C 21/36
USPC ............................................................ 701/400
See application file for complete search history.

(56) References Cited

U.S. PATENT DOCUMENTS

| | | | |
|---|---|---|---|
| 5,519,410 A * | 5/1996 | Smalanskas et al. | 345/7 |
| 6,272,431 B1 * | 8/2001 | Zamojdo et al. | 701/454 |
| 8,195,386 B2 * | 6/2012 | Hu et al. | 701/436 |
| 2006/0085125 A1 * | 4/2006 | Shibata et al. | 701/211 |
| 2006/0155467 A1 * | 7/2006 | Hortner et al. | 701/211 |
| 2009/0005961 A1 | 1/2009 | Grabowski et al. | |

FOREIGN PATENT DOCUMENTS

| | | |
|---|---|---|
| JP | 2001-141495 A | 5/2001 |
| JP | 2009-198267 A | 9/2009 |
| KR | 10-2006-0089377 A | 8/2006 |
| KR | 10-1020505 | 3/2011 |
| KR | 10-2013-0027367 | 9/2011 |
| KR | 10-2013-0062523 | 6/2013 |
| KR | 10-1271235 B1 | 6/2013 |

OTHER PUBLICATIONS

"Augmented Reality Navigation", Naver Blog, Apr. 16, 2013, 10 pages, <http://blog.naver.com/circus_ar/50169475901>, English Abstract.

* cited by examiner

*Primary Examiner* — Mary Cheung
*Assistant Examiner* — Anne Mazzara
(74) *Attorney, Agent, or Firm* — Mintz Levin Cohn Ferris Glovsky and Popeo, P.C.; Peter F. Corless

(57) ABSTRACT

An apparatus and method of providing road guidance based on an augmented reality head-up display (HUD) are provided. The method includes creating, by a controller, a route toward a destination and operating the augmented reality HUD to display a virtual preceding vehicle driven along the route to show that the virtual preceding vehicle is driven in front of a traveling vehicle by a reference distance.

14 Claims, 2 Drawing Sheets

APPARATUS AND METHOD OF PROVIDING ROAD GUIDANCE BASED ON AUGMENTED REALITY HEAD-UP DISPLAY

CROSS-REFERENCE TO RELATED APPLICATION

This application is based on and claims priority from Korean Patent Application No, 10-2014-0015611, filed on Feb. 11, 2014 in the Korean Intellectual Property Office, the disclosure of which is incorporated herein in its entirety by reference.

BACKGROUND

1. Field of the Invention

The present invention relates to an apparatus and a method of providing road guidance based on an augmented reality head-up display (HUD), and more particularly, to a technology that allows a vehicle to more easily arrive at a preset destination while viewing movement of a virtual preceding vehicle to maximize convenience of driving, by creating the virtual preceding vehicle on an augmented reality HUD and then guiding the virtual preceding vehicle up to the preset destination in connection with a position of a driver's vehicle. In the present specification, the driver's vehicle or the traveling vehicle means a vehicle in which an apparatus of providing road guidance based on an augmented reality HUD according to the present invention is mounted, the virtual preceding vehicle means a graphic image displayed on the augmented reality HUD, and an actual preceding vehicle means another vehicle driven in front of the driver's vehicle.

2. Description of the Prior Art

A navigation apparatus that displays route information on a front glass of a vehicle to be accurately matched to an actual road using an augmented reality technology and a head-up display (HUD) technology has been developed. This navigation apparatus is configured to include a navigation unit configured to calculate the route information up to an input destination, an imaging device configured to obtain a front image of the vehicle, a first sensor unit configured to calculate positions of eyes of a driver as a three-dimensional coordinate using a three-dimensional depth sensor, an image processor configured to process the front image using an augmented reality and match the front image to the route information, and a display unit configured to output the route information onto the front glass of the vehicle, wherein the image processor is configured to correct a position of the route information output onto the front glass of the vehicle based on a change in the positions of the eyes.

Since this navigation apparatus displays the route information output onto the front glass (e.g., windshield) of the vehicle in a form of a road guidance line or a road guidance arrow matched to the actual road, visibility of a route is substantially low, such that the driver often mistakes the route. That is, the driver may not correctly visualize the route of the guidance due to the display merely showing a line or an arrow.

SUMMARY

Generally, when a driver follows a preceding vehicle being driven toward the same destination, the vehicle may be conveniently driven. However, it may be difficult to visually see the vehicle that is being driven towards the same destination. In addition, even though the preceding vehicle being driven toward the same destination is found, an inclination and a driving career of a driver of the preceding vehicle may not be recognized, such that it may be difficult to blindly follow the preceding vehicle. In other words, driving security of the preceding vehicle may not be secured, such that driving safety may not be secured.

Therefore, the present invention provides a technology of displaying route information on a front glass of a vehicle to be more accurately matched to an actual road using an augmented reality technology and a head-up display (HUD) technology, and representing the route information as a virtual preceding vehicle and representing various direction information and traffic information through the virtual preceding vehicle. In other words, the present invention provides an apparatus and a method of providing road guidance based on an augmented reality HUD that allows a driver to more easily arrive at a preset destination while following a virtual preceding vehicle, by creating the virtual preceding vehicle on an augmented reality HUD and then guiding the virtual preceding vehicle toward the preset destination in connection with a position of a driver's vehicle.

In one aspect of the present invention, an apparatus of providing road guidance based on an augmented reality HUD, may include: a route creator configured to create a route toward a destination; a controller configured to operate an augmented reality HUD to display a virtual preceding vehicle driven along the route created by the route creator to show that the virtual preceding vehicle is driven in front of a driver's vehicle by a reference distance; and the augmented reality HUD may be configured to display the virtual preceding vehicle under the operation of the controller.

In another aspect of the present invention, a method of providing road guidance based on an augmented reality HUD, may include: creating a route up to a destination; operating an augmented reality HUD to display a virtual preceding vehicle driven along the route to display that the virtual preceding vehicle is driven in front of a driver's vehicle by a reference distance; and displaying the virtual preceding vehicle on a HUD.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
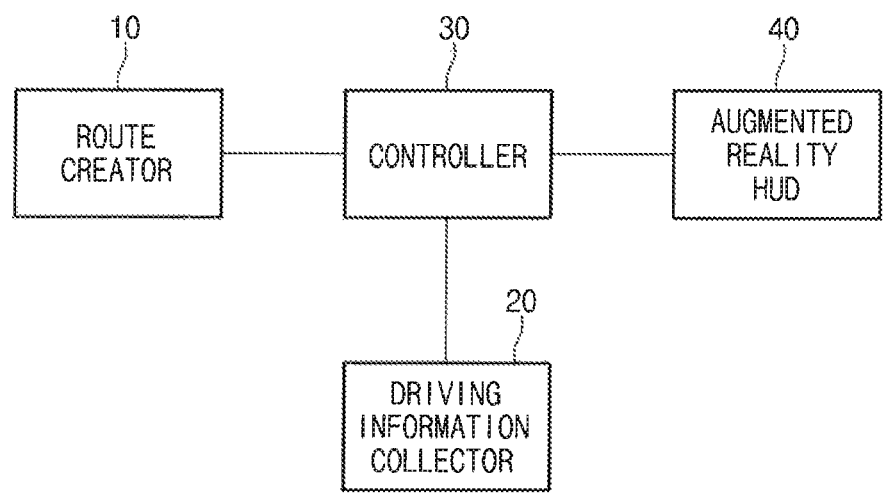
FIG. 1 is an exemplary block diagram of an apparatus of providing road guidance based on an augmented reality head-up display (HUD) according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM. RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings. FIG. 1 is an exemplary block diagram of an apparatus of providing road guidance based on an augmented reality head-up display (HUD) according to an exemplary embodiment of the present invention. As shown in FIG. 1, the apparatus of providing road guidance based on an augmented reality HUD according to an exemplary embodiment of the present invention may include a route creator 10, a driving information collector 20, a controller 30, and an augmented reality HUD 40. Each of the components will be described. The route creator 10, the driving information collector 20, and the augmented reality HUD 40 may be operated by the controller 20.

First, the route creator 10 may be configured to create a route toward a destination based on a route request of a driver. Accordingly, the route creator 10 may include a position information receiver and a map database. The position information receiver, which may be, for example, a global positioning system (GPS) receiver, may be configured to obtain a current position of the apparatus of providing road guidance based on an augmented reality HUD. The GPS receiver may be configured to calculate three-dimensional position information based on latitude, longitude, and altitude of one point in one time by calculating information regarding a distance between one point (entity) and three or more satellites and information regarding a time in which the distance information is measured and then applying trigonometry to the calculated distance information. Further, the GPS receiver may be configured to calculate position and time information using three satellites, correct errors of the calculated position and time information using another satellite, and continuously calculate a current position in real time and calculate speed information using the calculated current position. The map database may be configured to operate as a storage space in which a digital map containing various traffic information, guidance information, facility information, road information, and the like, may be stored.

Further, the driving information collector 20 may be configured to collect various driving information such as a speed of a driver's vehicle (e.g., a traveling vehicle), a distance from an actual preceding vehicle, and the like, via a vehicle network. In particular, the distance may be collected when the actual preceding vehicle is present within a predetermined distance range in front of the driver's vehicle. The vehicle network may include a controller area network (CAN), a local interconnection network (LIN), a FlexRay, a media oriented system transport (MOST), and the like.

The controller 30 may be configured to operate the augmented reality HUD 40 to display a virtual preceding vehicle driven along the route created by the route creator 10. Particularly, the virtual preceding vehicle, which is a graphic image displayed via the augmented reality HUD 40, may inform the driver of whether a traffic lane is changed through flickering of a turn signal lamp on the image. In other words, the controller 30 may be configured to operate the augmented reality HUD 40 to show that the virtual preceding vehicle is driven in front of the driver's vehicle by a predetermined distance. The predetermined distance may be adaptively changed based on the speed of the driver's vehicle. That is, as the speed of the driver's vehicle increases, the predetermined distance may increases. For example, a minimum value of the predetermined distance may be about 7.5 m, and a maximum value thereof may be about 105 m.

In addition, the controller 30 may be configured to operate the augmented reality HUD 40 to inform the driver of movement direction information of the driver's vehicle on the route created by the route creator 10 through the turn signal lamp of the virtual preceding vehicle. In other words, the turn signal lamp of the virtual preceding vehicle may be flickered to inform the driver of the movement direction. Particularly, the controller 30 may be configured to inform the driver of left and right turns in different schemes based on a distance (hereinafter, referred to as a remaining distance) from a current position to left and right turn points. For example, the controller 30 may be configured to operate the augmented reality HUD 40 to flicker the turn signal lamp of the virtual preceding vehicle at a period of a first time (for example, two seconds) when the remaining distance is about 500 m, flicker the turn signal lamp of the virtual preceding vehicle at a period of a second time (for example, one second) when the remaining distance is about 300, and display an animation on which the virtual preceding vehicle turns left and right when the remaining distance is about 100 m, the animation on which the virtual preceding vehicle turns left and/or right may be repeatedly displayed until the driver's vehicle actually turns left or right, and the virtual preceding vehicle may be displayed to have a color that becomes gradually lighter in color by adding a fading effect.

Furthermore, the controller 30 may be configured to inform the driver of left and right turns in different schemes based on a time (hereinafter, referred to as an arrival time) required for arriving at the left and/or right turn points from the current position. For example, the controller 30 may be configured to operate the augmented reality HUD 40 to display a turn signal from the current position to the left and/or right turn points when five seconds<arrival time (t)≤seven seconds, flicker the turn signal lamp of the virtual preceding vehicle when one second<arrival time (t)≤five seconds, and display the an animation on which the virtual preceding vehicle turns left/right when zero second<arrival time (t)≤one second.

In addition, the controller 30 may be configured to operate the augmented reality HUD 40 to display an animation on which the virtual preceding vehicle drives over a speed bump when the speed bump is present on the route created by the route creator 10. In particular, the controller 30 may also be configured to operate the augmented reality HUD 40 to display an animation showing impact that corresponds to the speed of the driver's vehicle.

Meanwhile, the controller 30 may be configured to operate the augmented reality HUD 40 to display the virtual preceding vehicle within a range of about 7.5 m or more to 105 m or less from the driver's vehicle. When the actual preceding vehicle is present in front of the driver's vehicle, for example, when the actual preceding vehicle is present within about 105 m from the driver's vehicle, the virtual preceding vehicle and the actual preceding vehicle may be viewed by the driver when the vehicles are overlapped with each other on the augmented reality HUD which may cause confusion for the driver. Therefore, in an exemplary embodiment of the present invention, when the virtual preceding vehicle and the actual preceding overlap with each other, provision of road guidance information through the virtual preceding vehicle may be stopped, and road guidance information and driving information may be displayed in the same scheme as a scheme according to the prior art. In other words, the road guidance information is provided through a figure, a text, an arrow, an icon, or the like. In particular, the driving information may also include information provided by a smart cruise control (SCC) system.

Figure 2:
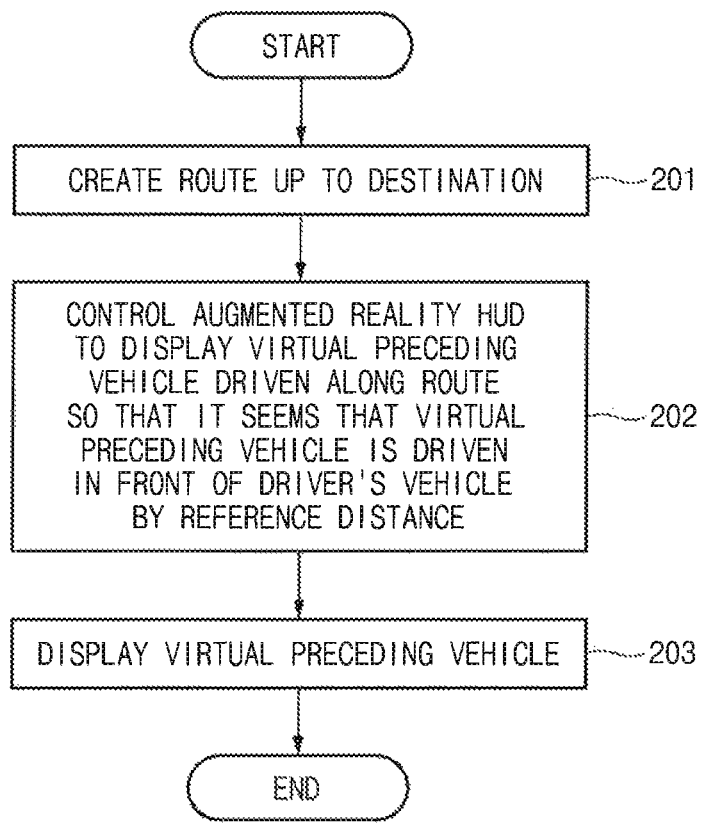
FIG. 2 is an exemplary flow chart of a method of providing road guidance based on an augmented reality HUD according to an exemplary embodiment of the present invention.

FIG. 2 is an exemplary flow chart of a method of providing road guidance based on an augmented reality HUD according to an exemplary embodiment of the present invention. First, the route creator 10 may be configured to create the route toward the destination (201). Then, the controller 30 may be configured to operate the augmented reality HUD 40 to display the virtual preceding vehicle driven along the route created by the route creator 10 to show that the virtual preceding vehicle is driven in front of the driver's vehicle by a reference distance (202). Then, the augmented reality HUD 40 may be configured to display the virtual preceding vehicle (203). In addition, the controller 30 may be configured to adjust the reference distance based on the speed of the driver's vehicle. In addition, the controller 30 may be configured to operate the augmented reality HUD 40 to display the turn signal lamp of the virtual preceding vehicle at different flickering periods based on the distance (hereinafter, referred to as a remaining distance) from the current position to the left and right turn points.

As set forth above, according to exemplary embodiments of the present invention, the virtual preceding vehicle may be created on the augmented reality HUD and may then be guided toward a preset destination in connection with the position of the driver's vehicle, thereby making it possible to allow the driver to more easily arrive at the preset destination while following the virtual preceding vehicle.

What is claimed is:
1. An apparatus of providing road guidance based on an augmented reality head-up display (HUD), comprising:
   a memory configured to store program instructions; and
   a processor configured to execute the program instructions, the program instructions when executed configured to:
      create a route toward a destination;
      display a virtual preceding vehicle driven along the route to show that the virtual preceding vehicle is driven in front of a traveling vehicle by a reference distance; and
      display a turn signal lamp of the virtual preceding vehicle at different flickering periods based on a remaining distance from a current position to left and right turn points.

2. The apparatus of providing road guidance based on an augmented reality HUD according to claim 1, wherein the program instructions when executed are further configured to:
   collect a speed of the traveling vehicle, wherein the reference distance is adjusted based on the speed of the traveling vehicle.

3. The apparatus of providing road guidance based on an augmented reality HUD according to claim 2, wherein the program instructions when executed are further configured to:
   display an animation on which the virtual preceding vehicle drives over a speed bump when the speed bump is present on the route.

4. The apparatus of providing road guidance based on an augmented reality HUD according to claim 3, wherein the program instructions when executed are further configured to:
   display an animation showing impact that corresponds to the speed of the traveling vehicle.

5. The apparatus of providing road guidance based on an augmented reality HUD according to claim 1, wherein the program instructions when executed are further configured to:
   display an animation on which the virtual preceding vehicle turns left and right when the remaining distance is within a threshold value.

6. The apparatus of providing road guidance based on an augmented reality HUD according to claim 5, wherein the program instructions when executed are further configured to:
   display the virtual preceding vehicle on the animation to have a color that becomes gradually lighter in color.

7. The apparatus of providing road guidance based on an augmented reality HUD according to claim 1, wherein the program instructions when executed are further configured to:
   flicker the turn signal lamp of the virtual preceding vehicle when an arrival time required for arriving at the left and right turn points from the current position is within a first threshold range; and
   display an animation on which the virtual preceding vehicle turns left or right when the arrival time is within a second threshold range.

8. A method of providing road guidance based on an augmented reality head-up display (HUD), comprising:
   creating, by a controller, a route toward a destination;
   operating, by the controller, the augmented reality HUD to display a virtual preceding vehicle driven along the route to show that the virtual preceding vehicle is driven in front of a traveling vehicle by a reference distance; and
   displaying, by the controller, a turn signal lamp of the virtual preceding vehicle at different flickering periods based on a remaining distance from a current position to left and right turn points.

9. The method of providing road guidance based on an augmented reality HUD according to claim 8, further comprising:
   collecting, by the controller, a speed of the traveling vehicle, wherein the reference distance is adjusted based on the speed of the traveling vehicle.

10. The method of providing road guidance based on an augmented reality HUD according to claim 9, further comprising:
    displaying, by the controller, an animation on which the virtual preceding vehicle drives over a speed bump when the speed bump is present on the route.

11. The method of providing road guidance based on an augmented reality HUD according to claim 10, further comprising:
    displaying, by the controller, an animation showing impact that corresponds to the speed of the traveling vehicle.

12. The method of providing road guidance based on an augmented reality HUD according to claim 8, further comprising:
    displaying, by the controller, an animation on which the virtual preceding vehicle turns left or right when the remaining distance is within a threshold value.

13. The method of providing road guidance based on an augmented reality HUD according to claim 12, further comprising:
    displaying, by the controller, the virtual preceding vehicle on the animation with a color that becomes gradually lighter in color.

14. The method of providing road guidance based on an augmented reality HUD according to claim 8, further comprising:
    flickering, by the controller, the turn signal lamp of the virtual preceding vehicle when an arrival time required for arriving at the left and right turn points from the current position is within a first threshold range; and
    displaying, by the controller, an animation on which the virtual preceding vehicle turns left or right when the arrival time is within a second threshold range.

* * * * *